US011374472B2

(12) United States Patent
Liu et al.

(10) Patent No.: US 11,374,472 B2
(45) Date of Patent: Jun. 28, 2022

(54) DEVICE FOR LOADING AND SEPARATING MAGNETS FOR AN ENERGY MOTOR ROTOR

(71) Applicant: JEE TECHNOLOGY CO., LTD., Anhui (CN)

(72) Inventors: Lei Liu, AnHui (CN); Yulong Yao, AnHui (CN); Bo Wang, AnHui (CN); Shanwei Xia, AnHui (CN); Aiwen Shi, AnHui (CN)

(73) Assignee: JEE TECHNOLOGY CO., LTD., Anhui (CN)

( * ) Notice: Subject to any disclaimer, the term of this patent is extended or adjusted under 35 U.S.C. 154(b) by 409 days.

(21) Appl. No.: 16/492,124

(22) PCT Filed: Dec. 26, 2018

(86) PCT No.: PCT/CN2018/123753
§ 371 (c)(1),
(2) Date: Sep. 7, 2019

(87) PCT Pub. No.: WO2020/015319
PCT Pub. Date: Jan. 23, 2020

(65) Prior Publication Data
US 2021/0336515 A1    Oct. 28, 2021

(30) Foreign Application Priority Data
Jul. 18, 2018  (CN) .......................... 201810807177.0

(51) Int. Cl.
*H02K 15/03*  (2006.01)
*H02K 15/02*  (2006.01)

(52) U.S. Cl.
CPC ........... *H02K 15/03* (2013.01); *H02K 15/022* (2013.01)

(58) Field of Classification Search
CPC ....... H02K 15/03; H02K 15/02; B23P 10/001; B65G 47/82; B65G 47/06
See application file for complete search history.

(56) References Cited

U.S. PATENT DOCUMENTS

2016/0194163 A1   7/2016  Bauman
2016/0241116 A1*  8/2016  Mine ...................... H02K 15/02

FOREIGN PATENT DOCUMENTS

CN    104201838 A    12/2014
CN    104743354 A    7/2015
(Continued)

*Primary Examiner* — Livius R. Cazan
(74) *Attorney, Agent, or Firm* — Craft Chu PLLC; Andrew W. Chu

(57) ABSTRACT

The magnetic steel loading and separating device is used for separating magnetic steel strips and large plastic spacers of a magnetic steel plate, and includes a material case, a material pushing mechanism and a material separating mechanism. The material case includes a case body for accommodating the magnetic steel plate, and a discharge port is formed in a side wall of the case body. The material pushing mechanism is used for successively pushing the magnetic steel strips and the large plastic spacers of the magnetic steel plate out of the material case via the discharge port, wherein a discharge position and a take-up position that are provided for the magnetic steel strip are formed outside the material case. The material separating mechanism includes a magnetic steel pushing block that reciprocates between the discharge position and the take-up position of the magnetic steel strip.

9 Claims, 11 Drawing Sheets

(56) References Cited

FOREIGN PATENT DOCUMENTS

| CN | 104828541 | A |   | 8/2015 |            |
|----|-----------|---|---|--------|------------|
| CN | 206427697 | U |   | 8/2017 |            |
| CN | 107186467 | A |   | 9/2017 |            |
| CN | 107877125 | A | * | 4/2018 |            |
| CN | 109230463 | A | * | 1/2019 | ............ H02K 15/02 |
| KR | 20030073470 | A |   | 9/2003 |            |
| KR | 20170003342 | A | * | 1/2017 |            |

* cited by examiner

DEVICE FOR LOADING AND SEPARATING MAGNETS FOR AN ENERGY MOTOR ROTOR

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to loading and separating magnets for a new energy motor rotor, and the device used for loading and separating the magnets for assembling a new energy motor rotor.

2. Description of Related Art Including Information Disclosed Under 37 CFR 1.97 and 37 CFR 1.98

With the booming development of new energy vehicles, the demand for motor production is growing. When new energy vehicle drive motors (i.e., new energy motors) are mass-produced, assembling magnets or magnet strips in motor rotors is a time-consuming and labor-consuming process in the production of the motors. In the actual assembling work for motor rotors, the magnets or magnet strips are integrally packaged in a laminated manner and are spaced by plastic spacers. The process of assembling the motor includes: separation of the magnets or magnet strips; magnetic pole identification; and embedding the magnets or magnet strips into a rotor punch.

The magnets or magnet strips for motor rotors are manually assembled. The incoming magnets or magnet strips are assembled in a magnet plate assembly. The magnet plate assembly is manually divided into rows, and each row is subdivided into individual magnets or magnet strips. The loose magnets or magnet strips are manually assembled into the rotor punch. This method is time-consuming and labor-consuming, resulting in very low assembling efficiency, which is detrimental to the mass production of motors.

There are also some assembling methods which are similarly semi-automatic, such as a feeding mechanism of an automatic magnet plug-in device for a motor disclosed in the Chinese patent document CN204103690 U, and a rotor magnet assembling tool for a permanent magnet synchronous motor disclosed in the Chinese patent document CN104201838 A. However, it is very common to divide a a row of magnets into the individual magnet rows, but uncommon to divide a magnet plate assembly into the individual magnets in these methods. Due to continuous needs for manual participation, the production efficiency of the motor rotors cannot be improved significantly, and the needs for large-scale automatic production cannot be satisfied.

BRIEF SUMMARY OF THE INVENTION

An objective of the present invention is to provide a device for loading and separating magnets for a new energy motor rotor, so as to solve the problem that the existing process for magnets to be assembled in new energy motor rotors cannot adapt to large-scale automatic production.

Therefore, the present invention provides a device for loading and separating magnets or magnet strips for a new energy motor rotor. The device is used for separating magnet rows from large plastic spacers of a magnet plate assembly. The device comprises a material case or case, a material pushing mechanism and a material separating mechanism, wherein the material case is used for accommodating the magnet plate assembly, and a discharge port is formed in a side wall of the material case. The material pushing mechanism is used for successively pushing the magnetic steel strip or magnet row and the large plastic spacer of the magnet plate assembly out of the material case via the discharge port. A discharge position and a take-up position that are provided for the magnetic steel strip or magnet row are formed outside the material case. The material separating mechanism comprises a pushing block that reciprocates between the discharge position and the take-up position of the magnet row. The pushing block is used for lifting the magnetic steel strip or magnet row from the discharge position to the take-up position, and in this process, the large plastic spacer is pushed out of the discharge port. The pushing block is also used for stripping the large plastic spacer when returning to the discharge position.

Furthermore, the pushing block is provided with an upper bearing groove and a lower bearing groove. The upper bearing groove is used for bearing the magnetic steel strip or magnet row at the discharge position. The lower bearing groove is used for bearing the large plastic spacer when the pushing block is at the take-up position.

Further, the material case is internally provided with an incoming material placement position at which the magnetic steel plate or magnet plate assembly is placed. The device further comprises a material shifting mechanism used for pushing the magnetic steel plate or magnet plate assembly to a working position from the incoming material placement position. The material pushing mechanism is used for successively pushing the magnetic steel strips or magnet rows and the large plastic spacers of the magnetic steel plate or magnet plate assembly at the working position out of the material case via the discharge port.

Further, the length of an accommodating space of the case body is 2 times greater than or equal to the width of the magnetic steel plate or magnet plate assembly, and the width of the accommodating space of the case body is equal to the length of the magnetic steel plate or magnet plate assembly.

Further, the device for the new energy motor rotor further comprises a cover plate for sealing an opening of the case body of the material case.

Further, the material pushing mechanism comprises a pushing plate, and a material pushing electro-actuator having a controllable material pushing stroke.

Further, the device for loading and separating magnets for the new energy motor rotor further comprises a rack for supporting the material case.

Further, the device for loading and separating magnets for the new energy motor rotor further comprises a magnetic pole sensor for sensing a magnetic pole direction of the magnet or magnet strip at the take-up position.

The present invention has the following technical effects.

(1) According to the loading and separating device of the present invention, one plate or assembly may be loaded manually at a time. A large number of magnets included in one assembly can maintain the production for a longer time, such that the working efficiency is greatly improved and the labor is saved.

(2) One plate or assembly may be separated into rows of magnets, accompanied with precise positioning and fast operation. The separated state facilitates the subsequent fully-automatic assembling process.

(3) The plastic spacers in the magnetic steel plate or magnet plate assembly can be recycled by means of a simple mechanical structure. On the one hand, the cost is reduced, and the plastic spacers are prevented from scattering everywhere on the other hand.

Except for the objective, features and advantages described above, the present invention has other objectives, features and advantages. The present invention will now be described in further detail with reference to the accompanying drawings.

BRIEF DESCRIPTION OF THE SEVERAL VIEWS OF THE DRAWINGS

The accompanying drawings of the description, which constitute a part of this application, are used to provide a further understanding of the present invention. The exemplary embodiments of the present invention and the description thereof are intended to explain the present invention, rather than limiting the present invention improperly.

FIG. 7b is an A-A sectional view of FIG. 7a.

FIG. 8b is an A-A sectional view of FIG. 8a.

FIG. 9b is an A-A sectional view of FIG. 9a.

FIG. 10b is an A-A sectional view of FIG. 10a.

FIG. 11b is an A-A sectional view of FIG. 11a.

FIG. 12b is an A-A sectional view of FIG. 12a.

FIG. 13b is an A-A sectional view of FIG. 13a.

FIG. 14b is an A-A sectional view of FIG. 14a.

DETAILED DESCRIPTION OF THE INVENTION

Figure 1:
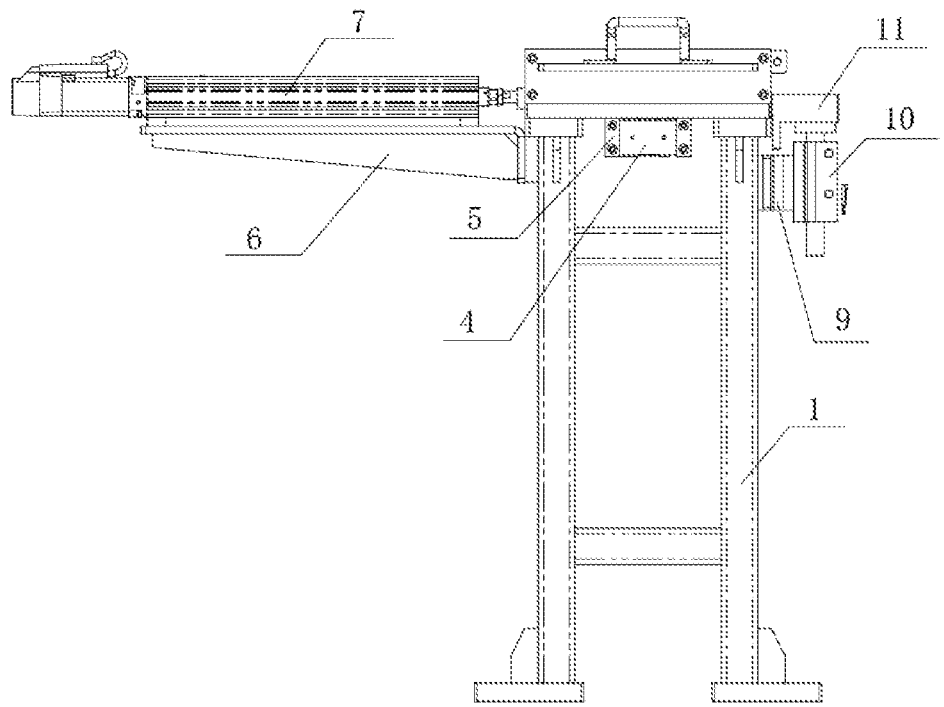
FIG. 1 is a schematic view of structural diagram of a device for loading and separating magnets for a new energy motor rotor according to an embodiment of the present invention.
Figure 2:
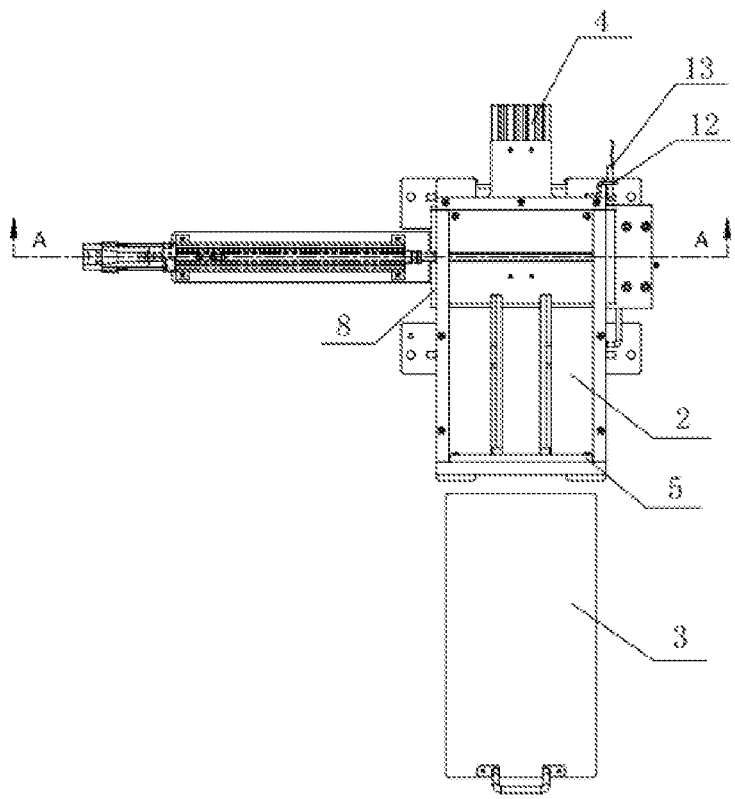
FIG. 2 is a top plan view of a device for loading and separating magnets for a new energy motor rotor according to an embodiment of the present invention.
Figure 3:
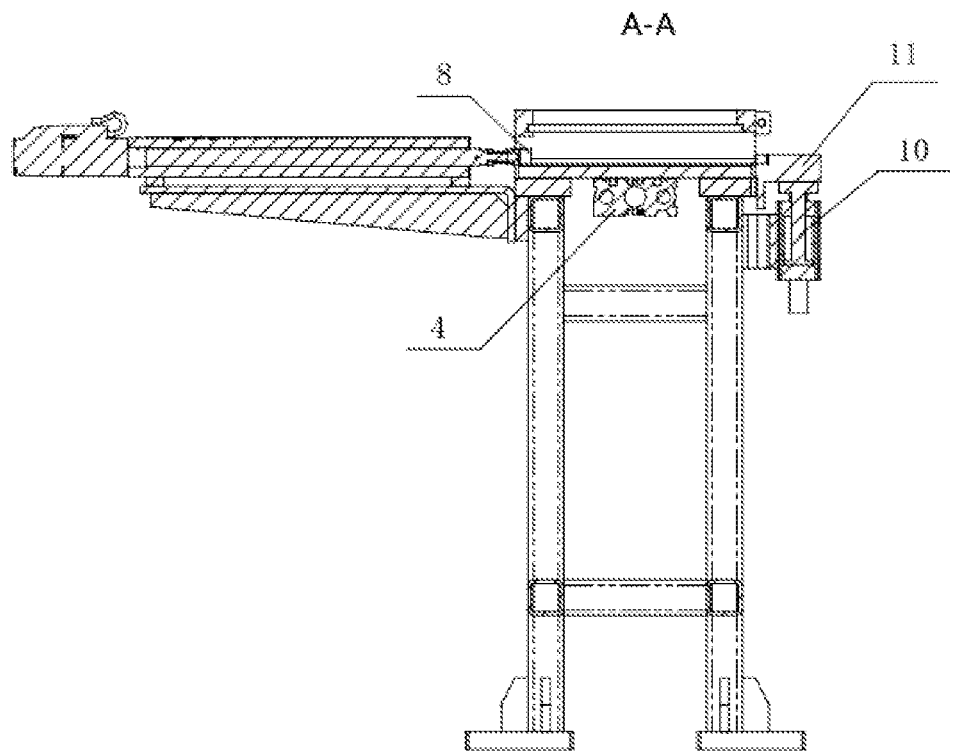
FIG. 3 is an A-A sectional view of the device for loading and separating magnets for the new energy motor rotor as shown in FIG. 2.

It should be noted that the embodiments in this application and the features in the embodiments may be combined with each other without conflict. The present invention will be described in detail below with reference to the accompanying drawings in conjunction with the embodiments.

FIGS. 1 to 14 illustrate some embodiments according to the present invention.

Referring to FIGS. 1 to 6, a device for loading and separating magnets of the present invention is applied to a loading and separating magnets process before a magnet of a motor rotor is assembled.

In an embodiment, the device of the present invention comprises a rack 1, a material case or case 2, a cover plate 3, a material shifting mechanism, a material separating device and a material pushing mechanism.

The case 2 is mounted on an upper mounting surface of the rack 1 which serves as a body part of a complete unit.

An accommodating space 2c of a magnetic steel plate or magnet plate assembly 14 is formed in the case 2. An incoming material placement position and a working position are provided for the magnet plate assembly 14 in the case. In order to accomplish the corresponding functions, a plurality of grooves and holes are machined in the case 2. The sidewall 2b of the case 2 is provided with a discharge port 2a. A magnetic steel strip or magnet row 15 and a large plastic spacer or magnet row spacer 17 of the magnet plate assembly 14 are pushed out of the case by means of the discharge port.

The cover plate 3 is mainly made of a transparent acrylic plate, is mounted in the case via an opening 2e in the case body 2d of the case 2 and an insertion slot in the case 2, and is capable of being inserted into or drawn out from the case. The cover plate 3 has a function of limiting the upper part of the magnets and preventing the magnets from inclining or falling when the magnets are placed in the material case. The transparent acrylic material facilitates observing the state of the magnetic steel.

The material shifting mechanism or means 4, 5 for shifting within said case is used for pushing the magnet plate assembly 14 to the working position from the incoming material placement position.

In an embodiment, the material shifting mechanism or means 4, 5 for shifting within said case comprises a first shifting cylinder 4 and a shifting sheet 5. The shifting sheet 5 is arranged on the first shifting cylinder 4 and used for shifting the magnet plate assembly 14 placed in the case 2.

The material pushing mechanism is used for successively pushing magnetic steel strips and large plastic spacers of the magnet plate assembly 14 out of the discharge port 2a, wherein a pushing stroke of the pushing mechanism is equal to the thickness of a pushed object. The material pushing mechanism is the means 7,8 for successively pushing from said accommodating space of said case through said discharge port to a discharge position outside of said case.

In an embodiment, the pushing mechanism or the means 7,8 for successively pushing comprises a pushing electro-actuator 7 and a first pushing plate 8. An electro-actuator mounting support 6 is mounted on the rack 1. The material pushing electro-actuator 7 is mounted above the electro-actuator mounting support 6. The first pushing plate 8 is arranged at the front end of the material pushing electro-actuator 7.

The material separating mechanism or means 10, 11 for pushing between said discharge position and a take-up position outside of said case comprises a pushing block 11. The pushing block 11 reciprocates between a discharge position and a take-up position of the magnet row 15, and is used for lifting the magnet row 15 from the discharge position to the take-up position. In addition, the magnet row spacer 17 is "scraped off" when the pushing block 11 descends back to the discharge position from the take-up position.

Figure 4:
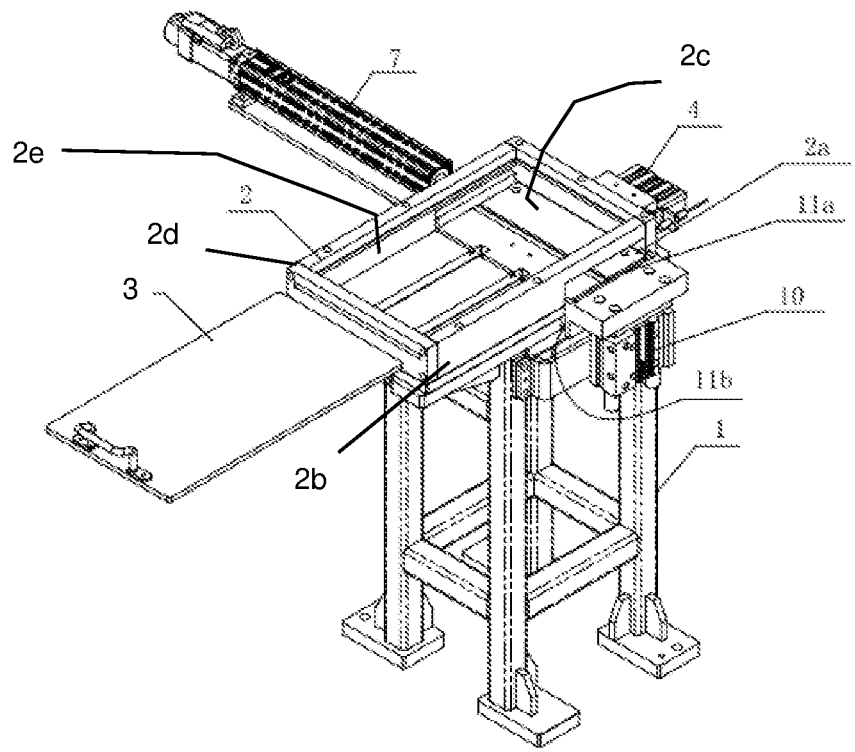
FIG. 4 is a schematic view of structural stereogram of a device for loading and separating magnets for a new energy motor rotor according to an embodiment of the present invention.

As shown in FIG. 4, the pushing block 11 is provided with an upper bearing groove 11a and a lower bearing groove 11b. The upper bearing groove is used for accommodating the magnet row 15 at the discharge position. The lower bearing groove is used for accommodating the magnet row spacer 17 at the take-up position.

In an embodiment, the material separating mechanism or means 10, 11 for pushing between said discharge position and a take-up position outside of said case comprises a second shifting cylinder 10 for driving the pushing block 11. The second shifting cylinder 10 is mounted on a cylinder mounting support 9. The pushing block 11 is located at the upper end of the second shifting cylinder 10.

A magnetic pole sensor 13 is arranged on the periphery of the case 2 and used for sensing a magnetic pole direction of a magnet that is pushed out finally. The magnetic pole sensor 13 is arranged on a mounting support 12.

A working principle of the device of the present invention is as follows.

(1) A magnet plate assembly 14 is placed into the case 2 manually from the outside of automated magnet packaging or assembling equipment. The subsequent steps can be completely automated by an actuation mechanism. The first shifting cylinder 4 shifts the magnet plate assembly 14 from the magnetic steel assembling equipment automatically in a Y direction. The inside and the outside of the equipment are spaced by a safety protection net.

(2) The first shifting cylinder 4 shifts the magnet plate assembly 14 to the working position, and the electro-actuator 7 pushes the magnet plate assembly 14 to a second working position horizontally in an X direction. Since the electro-actuator 7 can theoretically move an infinite number of controllable positions within a stroke range, the horizontal movement of one magnet plate assembly 14 at a plurality of positions can be satisfied.

(3) When the magnet plate assembly 14 reaches the second working position, there is upper bearing groove 11a of the pushing block 11, such that the upper bearing groove 11a just bears one magnet row 15. This magnet row 15 may be pushed out vertically by the second shifting cylinder 10 in a Z direction, such that this magnet row 15 is a part of magnet plate assembly 14 exposed to facilitate subsequent operation of gripping the magnet row 15 from a different position by using a robot.

(4) During the ascending process of the second shifting cylinder 10, the electro-actuator 7 is pushed forward for a short distance, so that the magnet row spacer 17 is stuck in the lower bearing groove 11b of the pushing block 11. The plastic spacer or magnet row spacer 17 may be "scraped off" when the second shifting cylinder 10 descends, thereby accomplishing the recycle of the magnet row spacer 17.

Figure 5:
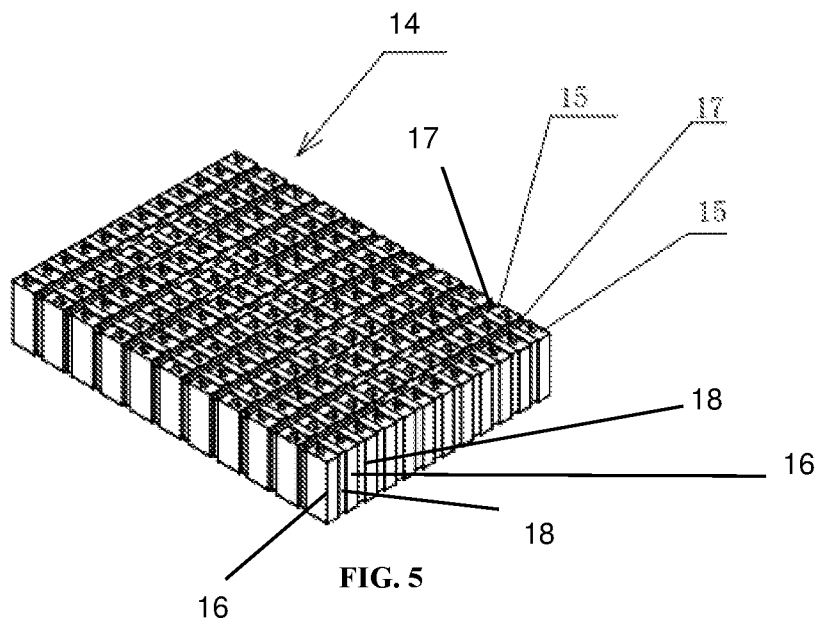
FIG. 5 is a schematic view of a structural stereogram of a magnetic steel plate or magnet plate assembly to be used with the device for loading and separating magnets for a new energy motor rotor according to an embodiment of the present invention.
Figure 6:
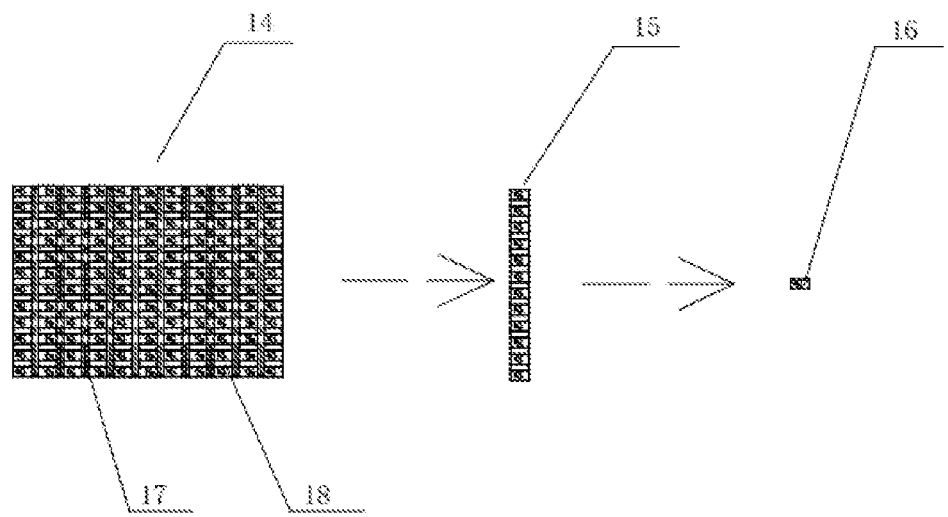
FIG. 6 is a schematic view of a flowchart when the magnetic steel plate or magnet plate assembly is separated into magnetic steel strips or magnet rows and then the strips rows are subdivided into magnetic steel sheets or magnet strips according to an embodiment of the present invention

FIG. 5 shows a state of an incoming material of the magnet plate assembly 14. FIG. 6 is a schematic diagram when one magnet plate assembly 14 is separated into magnet rows 15, and then the magnet rows 15 are subdivided into magnet strips 16. Due to the magnetic characteristics of each magnet strip 16, the magnetic pole directions of all magnet strips 16 are oriented in the same direction. The magnetic pole directions of every two adjacent magnet strips 16 are opposite, and there is a great magnetic attraction force between every two adjacent magnet rows 15 and between every two adjacent magnet strips 16. For sake of separation, a small plastic spacer or magnet strip spacer 18 is arranged between every two adjacent magnet strips 16, and a magnet row spacer 17 is arranged between every two adjacent magnet rows 15.

Figure 7A:
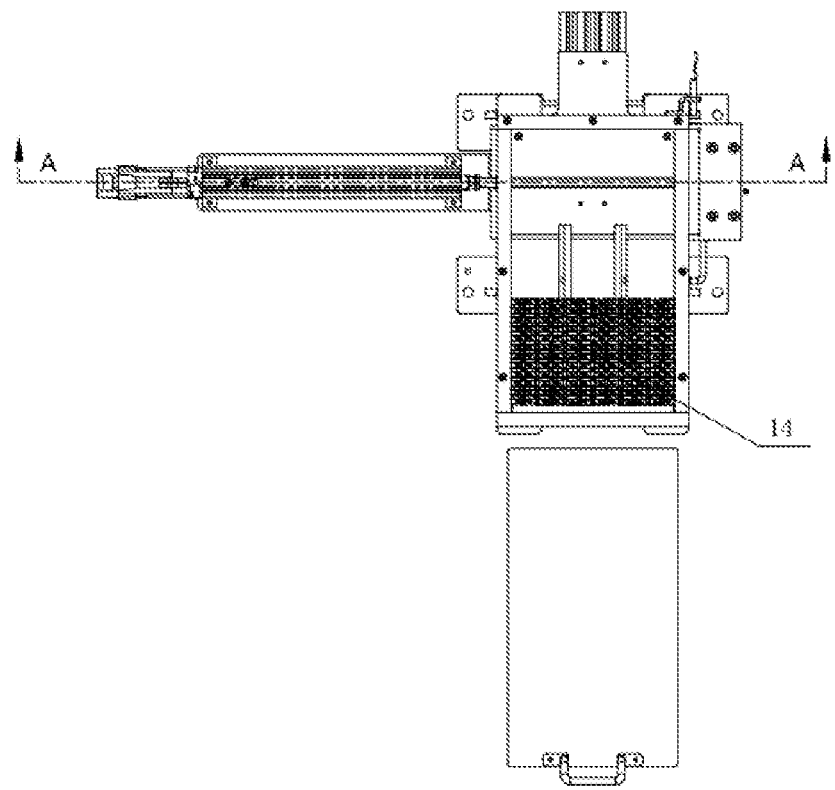
FIG. 7a is a schematic view of a diagram when one magnetic steel plate or magnet plate assembly is manually placed in a material case of the loading and separating device according to an embodiment of the present invention.
Figure 7B:
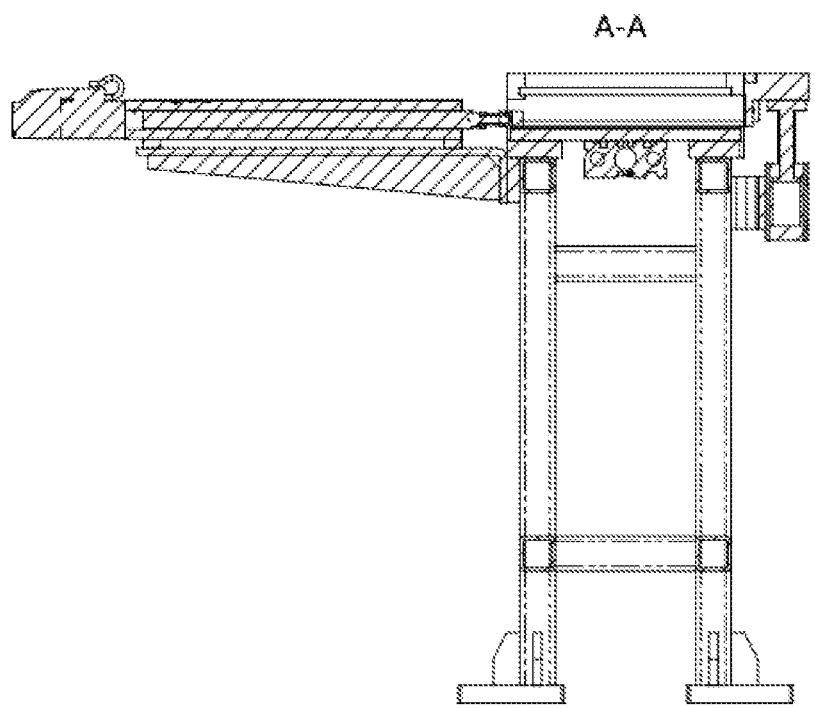
Figure 8A:
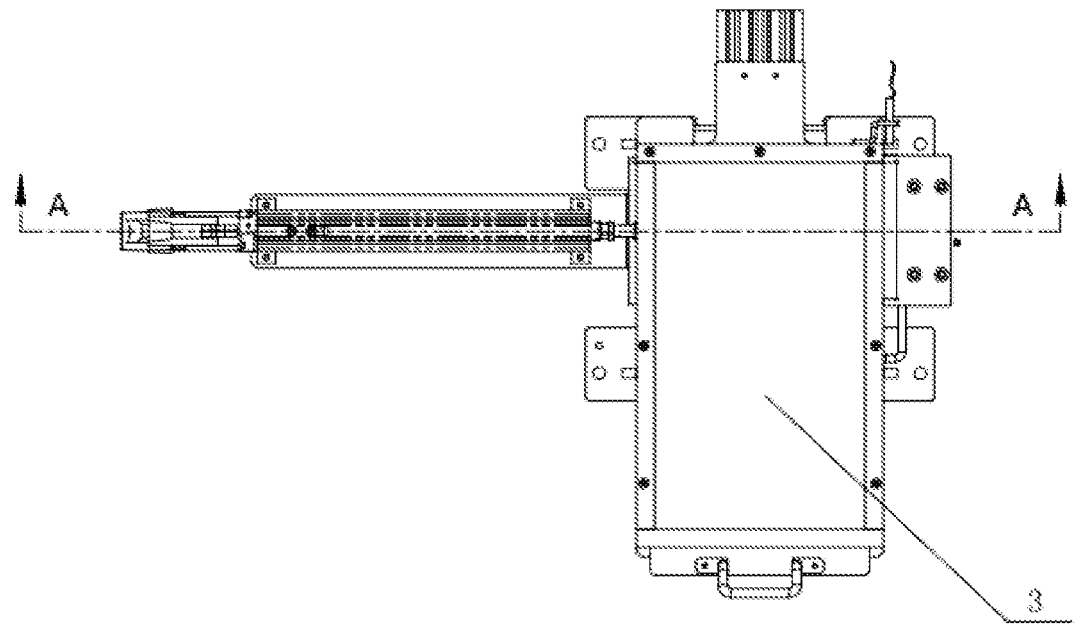
FIG. 8a is a schematic view of a diagram when a cover plate is closed according to an embodiment of the present invention.
Figure 8B:
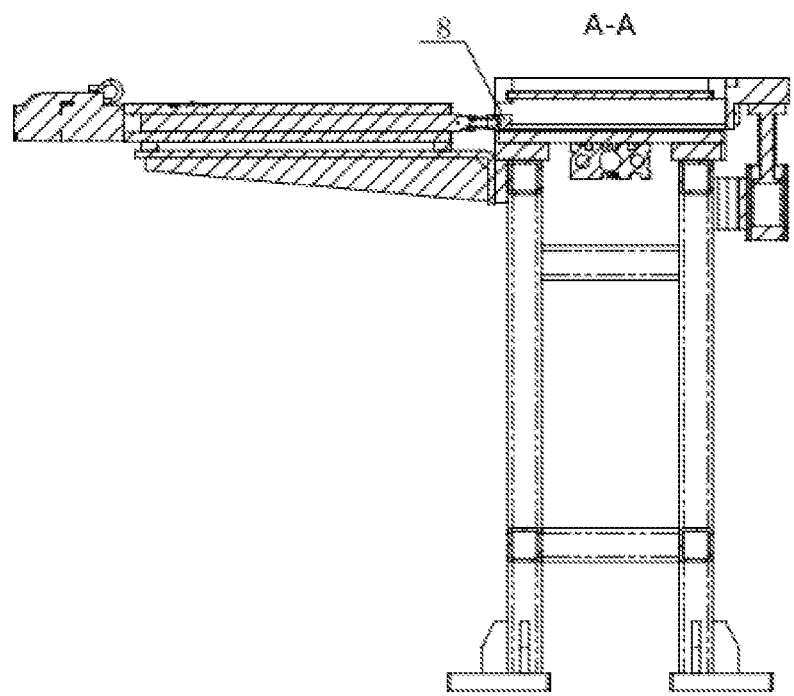
Figure 13A:
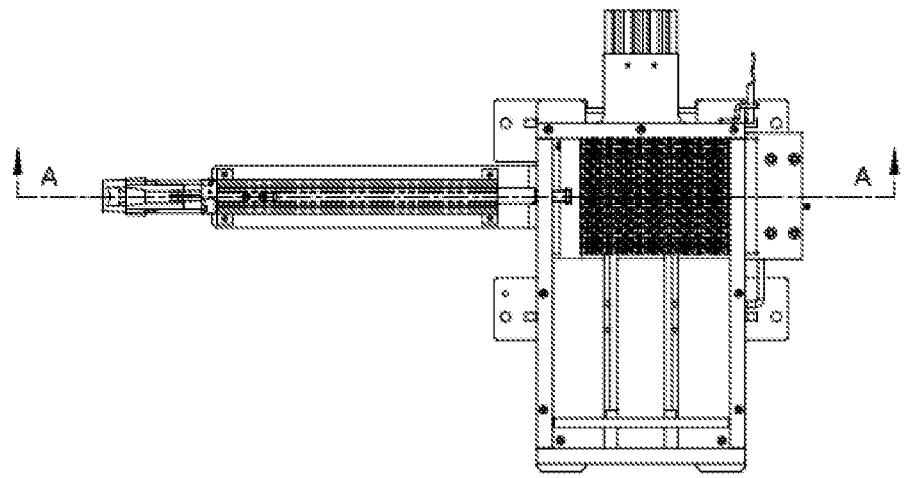
FIG. 13a is a schematic view of a structure diagram when a large plastic spacer is separated according to an embodiment of the present invention.
Figure 13B:
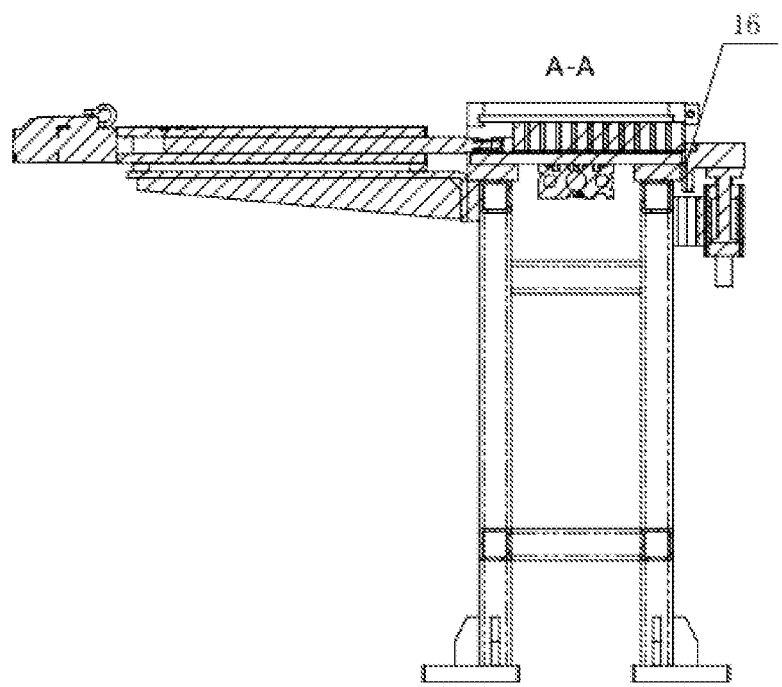
Figure 14A:
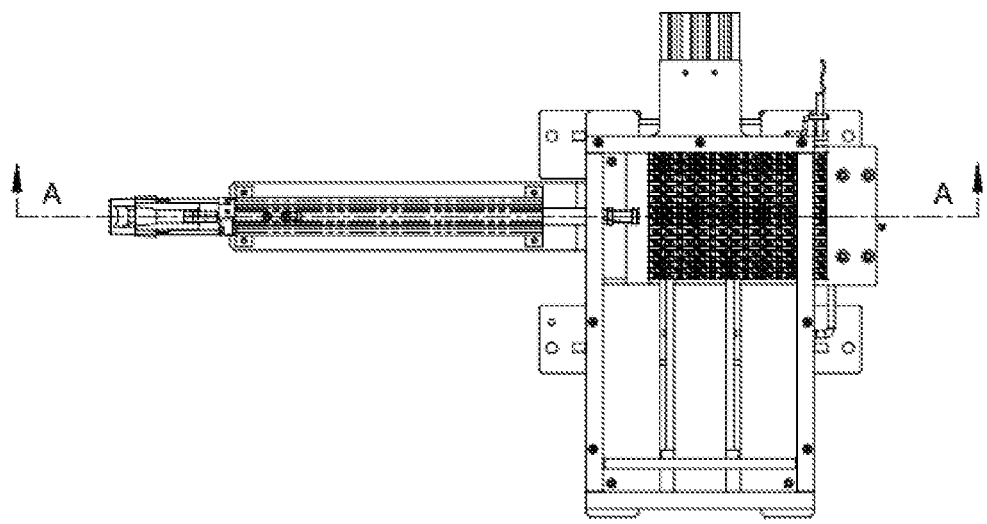
FIG. 14a is a schematic view of a diagram when another magnetic steel strip or magnet row of a magnetic steel plate or magnet plate assembly is pushed out of the discharge port of the material case according to an embodiment of the present invention.
Figure 14B:
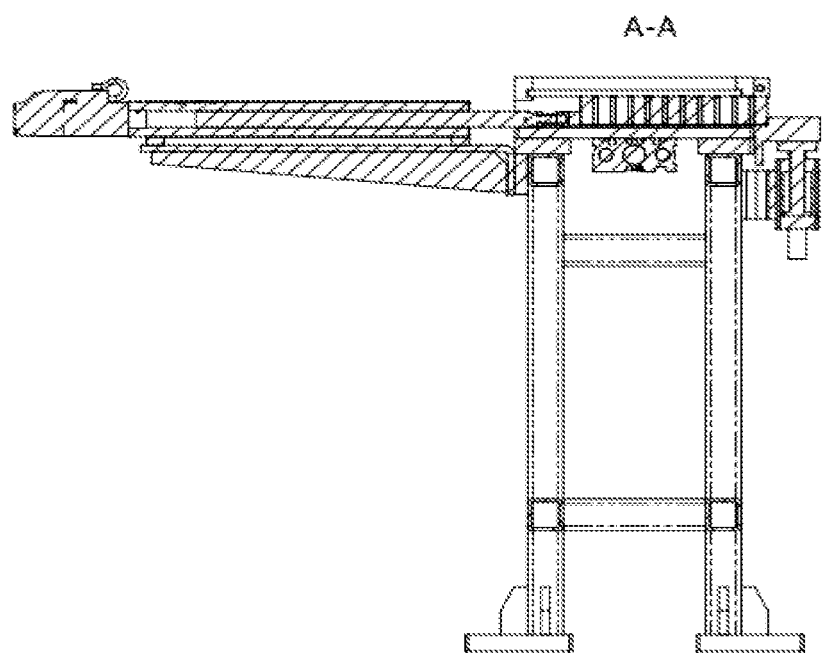

FIG. 7a, FIG. 8a and FIG. 14a illustrate the whole loading and separating process of magnets 16 from the assembly 14. FIG. 7a illustrates manual placement of a magnet plate assembly 14 in the case 2. FIG. 8a is a schematic diagram when a cover plate 3 is closed. For sake of understanding and observing, FIG. 9a, and FIGS. 10a to 14a illustrate a schematic diagram when the cover plate 3 is drawn out, wherein the cover plate 3 is always closed in the actual production process.

Figure 9A:
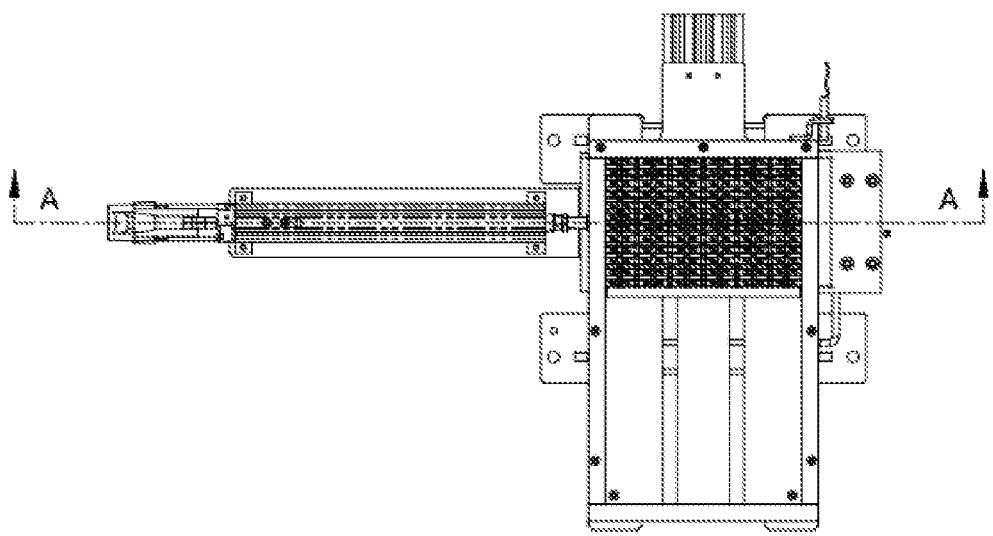
FIG. 9a is a schematic view of a diagram when a magnetic steel plate or magnet plate assembly is pushed in place in the material case according to an embodiment of the present invention.
Figure 9B:
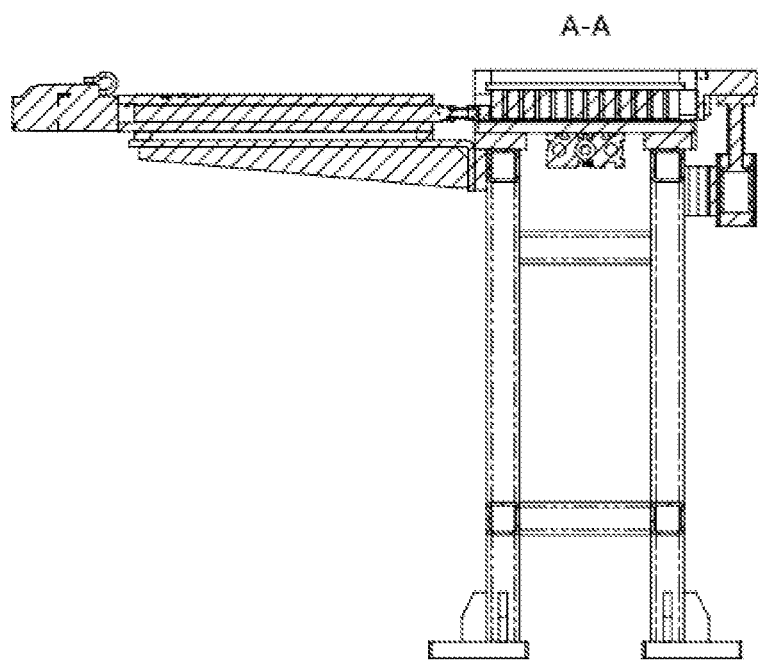
Figure 10A:
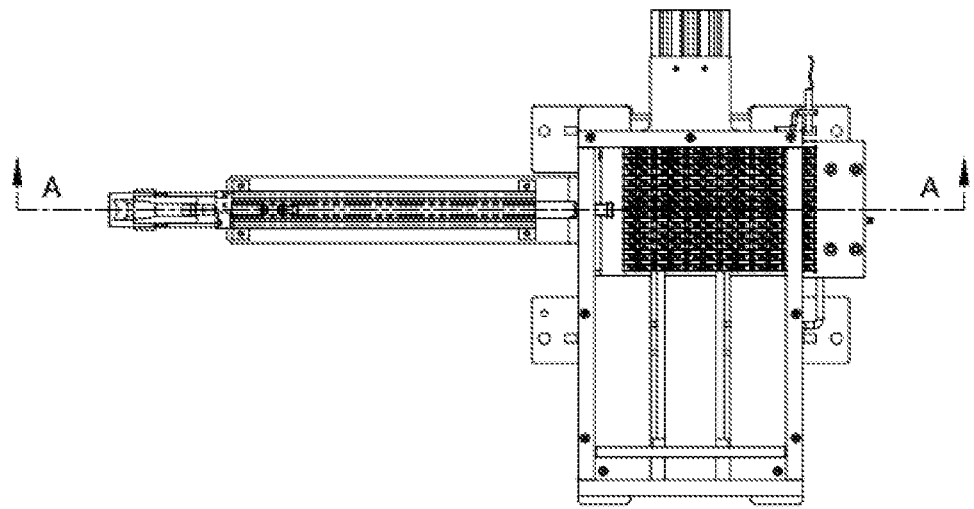
FIG. 10a is a schematic view of a diagram when a magnetic steel strip or magnet row of a magnetic steel plate or magnet plate assembly is pushed out of a discharge port of the material case according to an embodiment of the present invention.
Figure 10B:
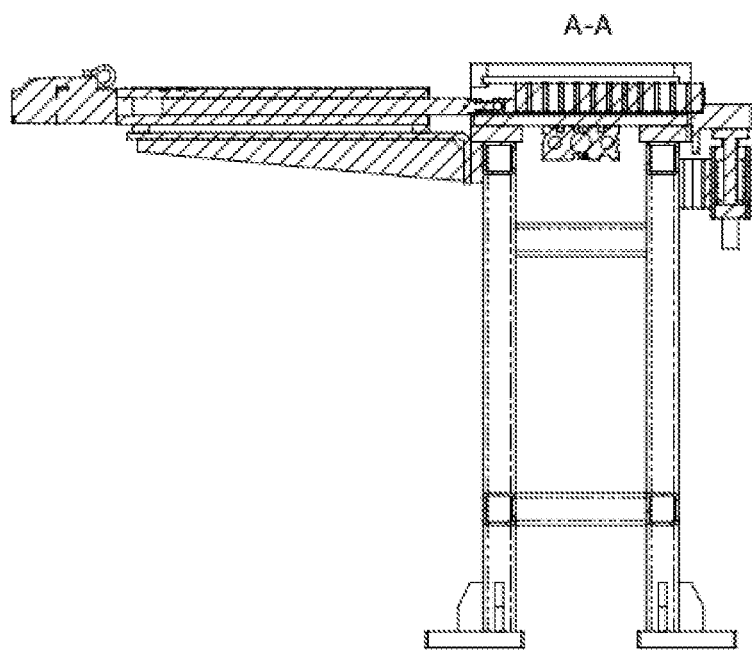
Figure 11A:
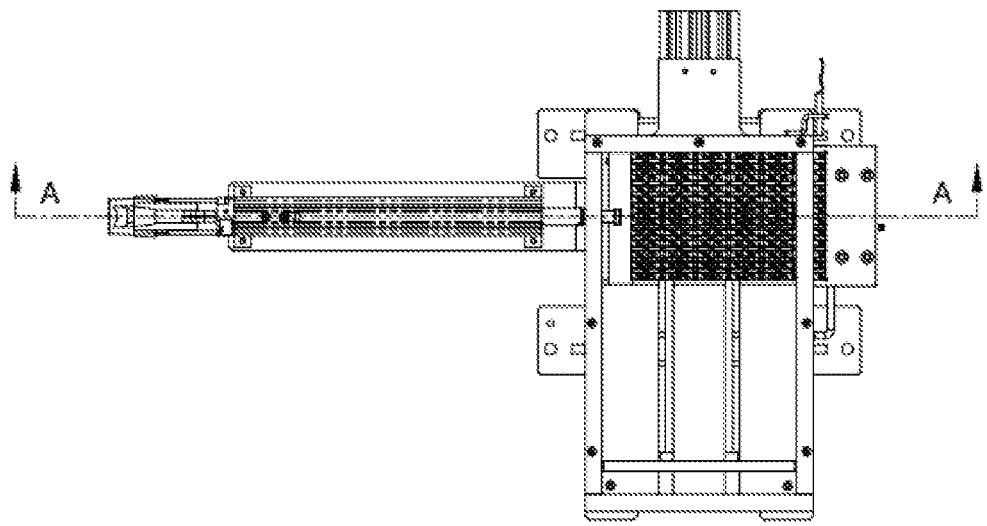
FIG. 11a is a schematic view of a diagram when a magnetic steel strip or magnet row outside the material case is lifted to a take-up position according to an embodiment of the present invention.
Figure 11B:
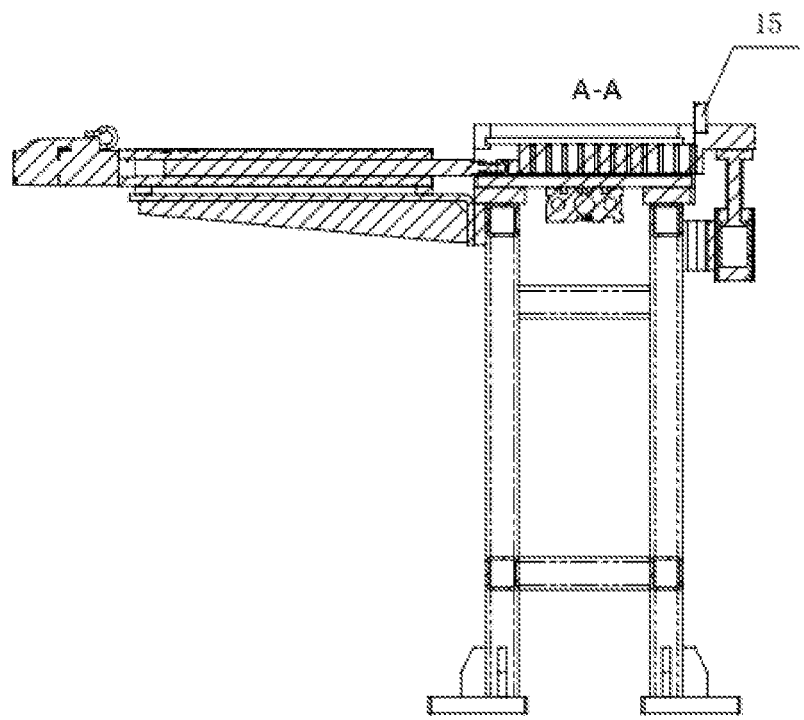
Figure 12A:
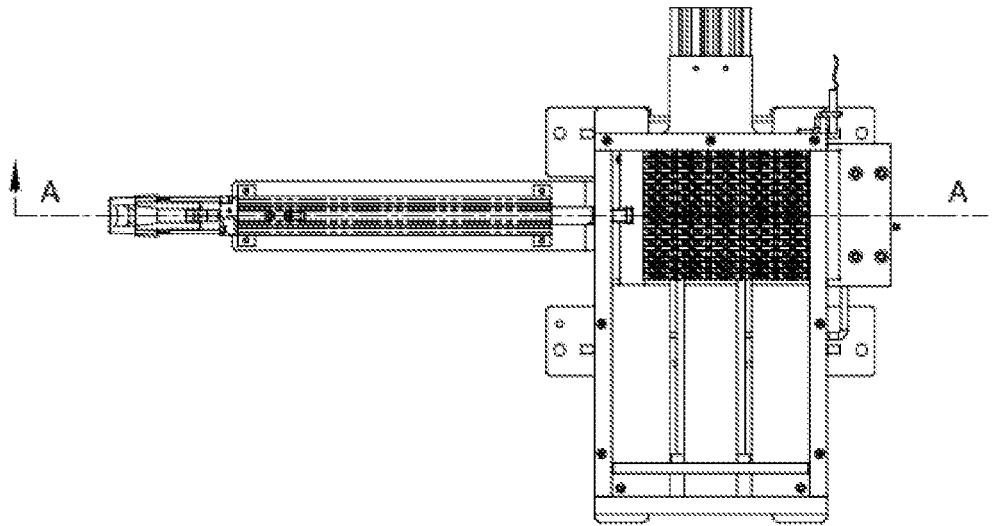
FIG. 12a is a schematic view of a diagram when a large plastic spacer is pushed in place according to an embodiment of the present invention.
Figure 12B:
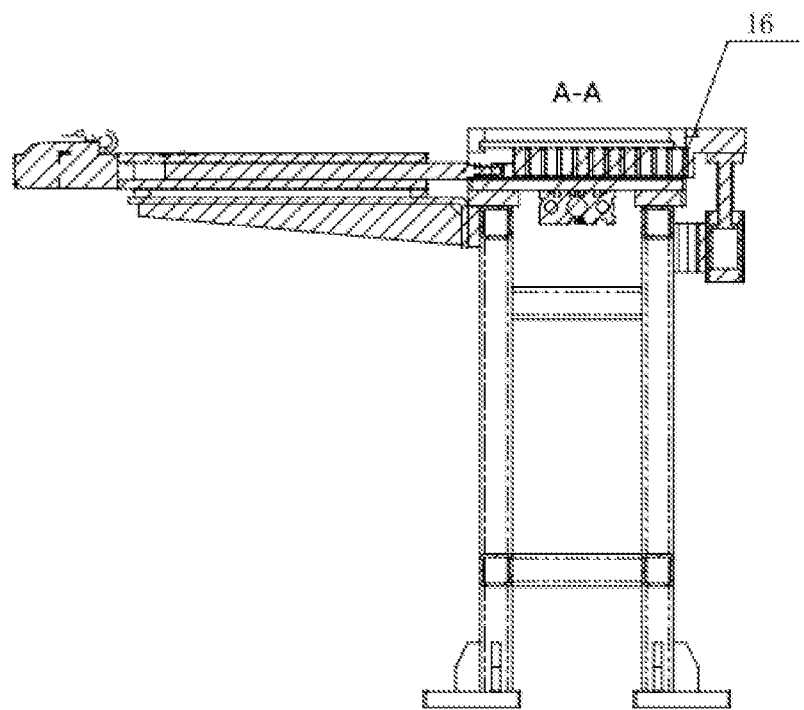

FIG. 9a, FIG. 10a and FIG. 11a illustrate a process of the magnet row 15 being pushed and separated, such that the magnet row 15 is exposed to facilitate subsequent gripping. FIG. 12a, FIG. 13a and FIG. 14a illustrate a recycling process of the magnet row spacer 17, such that the magnet row spacer 17 can be separated before the next cycle with the next magnet row 15 being pushed out, so as to continuously push out magnet rows 15.

A working process of the present invention is as follows.

A magnet plate assembly 14 is placed in the case 2 manually from the outside of the equipment. The cover plate 3 is closed. The first shifting cylinder 4 pushes the magnet plate assembly 14 to the first working position. The material pushing electro-actuator 7 pushes the magnet plate assembly 14 to a second working position horizontally in an X direction. The magnet row 15 on the rightmost side enters the upper bearing groove 11a of the pushing block 11. The second shifting cylinder actuates upwards to separate the magnet row 15 from the magnet plate assembly 14, such that the magnet row 15 is exposed. The magnetic pole sensor 13 senses a magnetic pole direction of the magnet row 15 that is pushed out, and makes a judgment.

Then, the material pushing electro-actuator 7 continues to move forward for a distance to push the magnet row spacer 17 into the lower bearing groove 11b of the pushing block 11. The second shifting cylinder actuates downward and returns to an original position, such that the magnet row spacer 17 is taken down. The material pushing electro-actuator 7 continues to actuate and executes the next cycle of pushing-separating a magnet row 15.

In a further embodiment, the structure of the loading and separating device of the present invention is simplified. Specifically, the magnet plate assembly 14 is directly placed in a working position, i.e., the working position is an incoming material placement position. Correspondingly, a material shifting mechanism is omitted. The device of this embodiment can also achieve the separation of the magnets 16 into magnet rows 15 and magnet row spacers 17.

The above descriptions are only preferred embodiments of the present invention and are not intended to limit the present invention. For those skilled in the art, the present invention may have various modifications and changes. Any amendment, equivalent substitution and improvement made within the spirit and principle of the present invention shall be contained in the protection scope of the present invention.

We claim:

1. A device for assembling an energy motor rotor with a plurality of magnet strips, each magnet strip of said plurality of magnet strips having a magnetic pole and being arranged in a magnet row with a magnetic strip spacer between adjacent magnet strips of said plurality of magnet strips, a plurality of magnet rows being arranged in a magnet plate assembly with a magnet row spacer between adjacent magnet rows of said plurality of magnet rows, said magnet row spacer being larger than said magnetic strip spacer, the device comprising:
    a case being comprised of a side wall having a discharge port so as to define an accommodating space for said magnet plate assembly within said case with each magnet row of said plurality of magnet rows and each magnet row spacer aligned for being pushed through said discharge port;
    means for successively pushing from said accommodating space of said case through said discharge port to a discharge position outside of said case; and
    means for pushing between said discharge position and a take-up position outside of said case,
    wherein said means for pushing from said discharge position to said take-up position is comprised of a second shifting cylinder and a pushing block connected to said second shifting cylinder,
    wherein said means for pushing between said discharge position and said take-up position is lifted from said discharge position to said take-up position so as to separate each magnet row of said plurality of magnet rows from said magnet plate assembly by pushing each magnet row of said plurality of magnet rows upward from said magnet plate assembly, and
    wherein said means for pushing between said discharge position and said take-up position is returned from said take-up position back to said discharge position so as to separate each magnet row spacer from said magnet plate assembly by pushing each magnet row spacer downward from said magnet plate assembly.

2. The device, according to claim 1, wherein said pushing block is comprised of an upper bearing groove and a lower bearing groove,
    wherein said upper bearing groove engages each magnet row of said plurality of magnet rows so as separate each magnet row of said plurality of magnet rows from said magnet plate assembly by said upper bearing groove pushing each magnet row of said plurality of magnet rows upward from said magnet plate assembly when said means for pushing between said discharge position and said take-up position is lifted from said discharge position to said take-up position, and
    wherein said lower bearing groove engages each magnet row spacer so as to separate each magnet row spacer from said magnet plate assembly by said lower bearing groove pushing each magnet row spacer downward from said magnet plate assembly when said means for pushing between said discharge position and said take-up position is returned from said take-up position to said discharge position.

3. The device, according to claim 1, wherein said case is comprised of a means for shifting within said case, and
    wherein said means for shifting within said case is comprised of a first shifting cylinder and a shifting sheet connected to said first shifting cylinder so as to move said magnet plate assembly into said accommodating space.

4. The device, according to claim 3, wherein said accommodating space has an accommodating space length greater than or equal to twice a width of said magnet plate assembly and an accommodating space width equal to a length of said magnet plate assembly.

5. The device, according to claim 1, wherein said case is further comprised of: a case body with a case opening; and a cover plate in removable sealing engagement with and over said case opening.

6. The device, according to claim 1, wherein said means for successively pushing is comprised of: an electro-actuator having a controlled pushing stroke and a first pushing plate connected to said electro-actuator so as to push each magnet row of said plurality of magnet rows and each magnet row spacer to said discharge position separately.

7. The device, according to claim 1, further comprising: a rack supporting said case.

8. The device, according to claim 1, further comprising: a magnetic pole sensor above said case and aligned with said take-up position so as to detect each magnetic pole of each magnet strip at the take-up position.

9. The device, according to claim 1, wherein said means for pushing from said discharge position to said take-up position is further comprised of a cylinder mounting support, said second shifting cylinder being mounted on said cylinder mounting support.

* * * * *